Nov. 26, 1963 M. SEITZ 3,112,116
COMBINED CENTERING AND CLAMPING ARRANGEMENT
Filed May 23, 1962 5 Sheets-Sheet 3

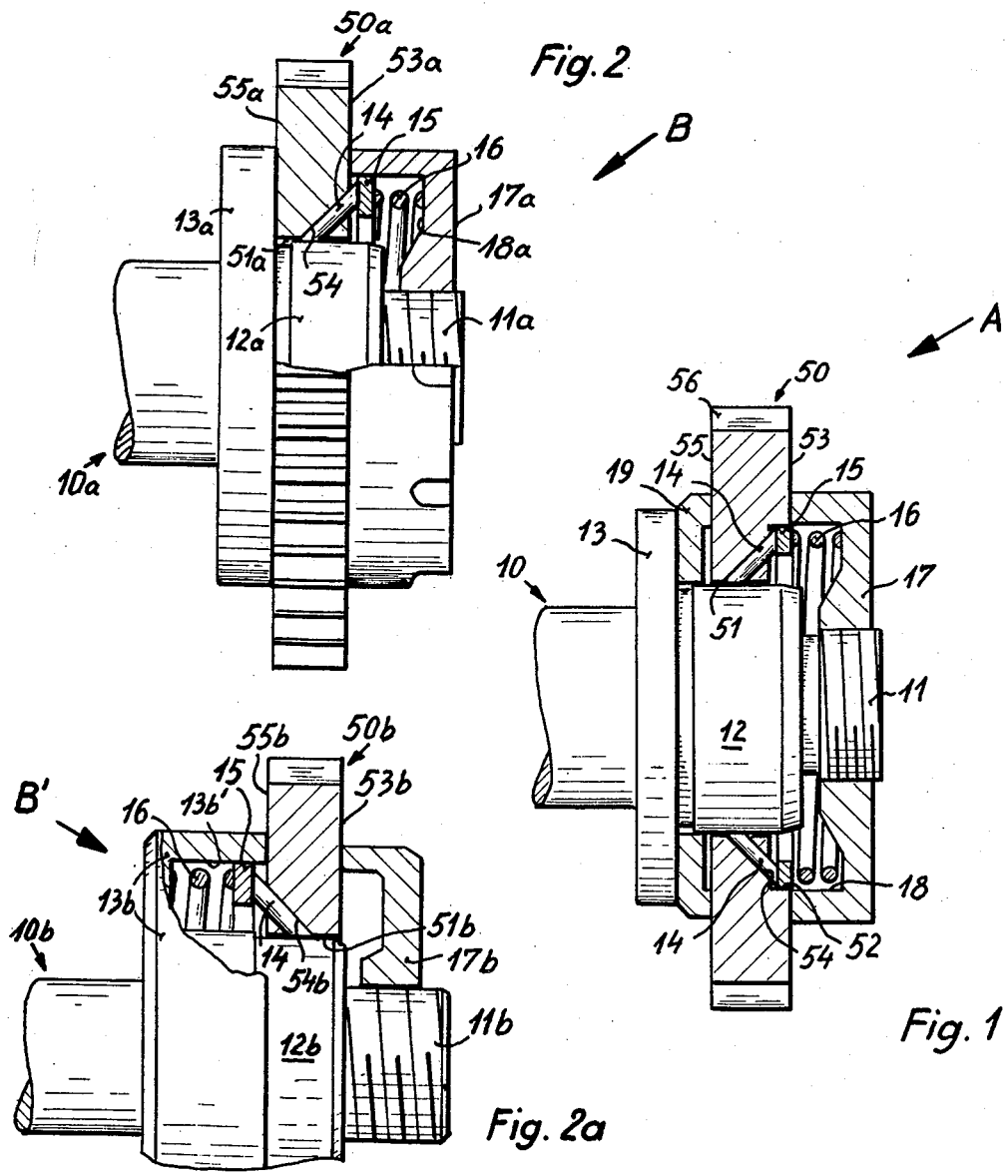
Nov. 26, 1963     M. SEITZ     3,112,116
COMBINED CENTERING AND CLAMPING ARRANGEMENT
Filed May 23, 1962     5 Sheets-Sheet 1
INVENTOR
Max Seitz
BY
his ATTORNEY

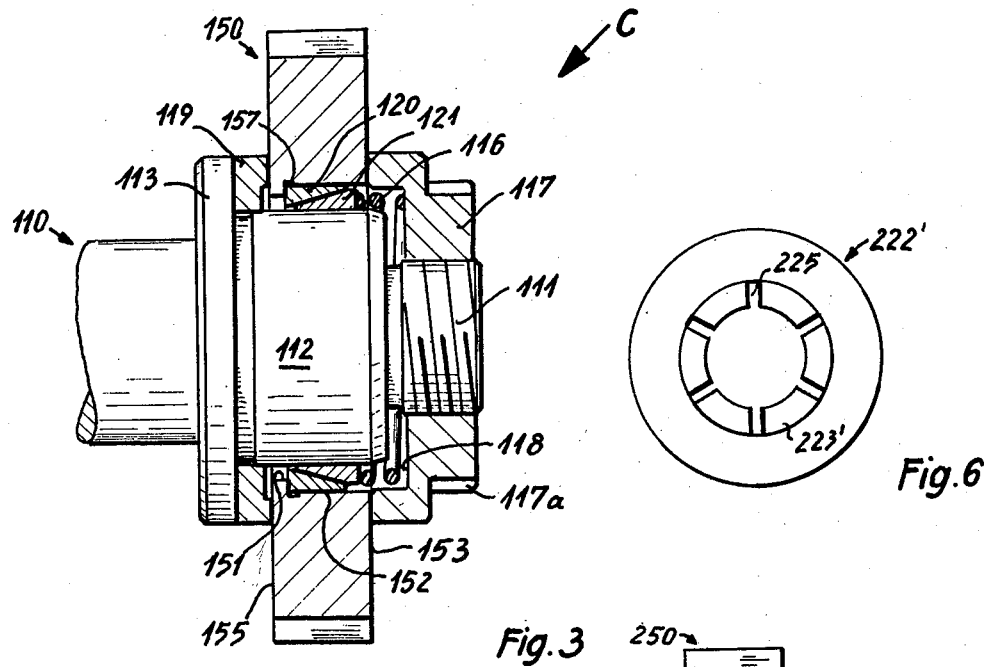
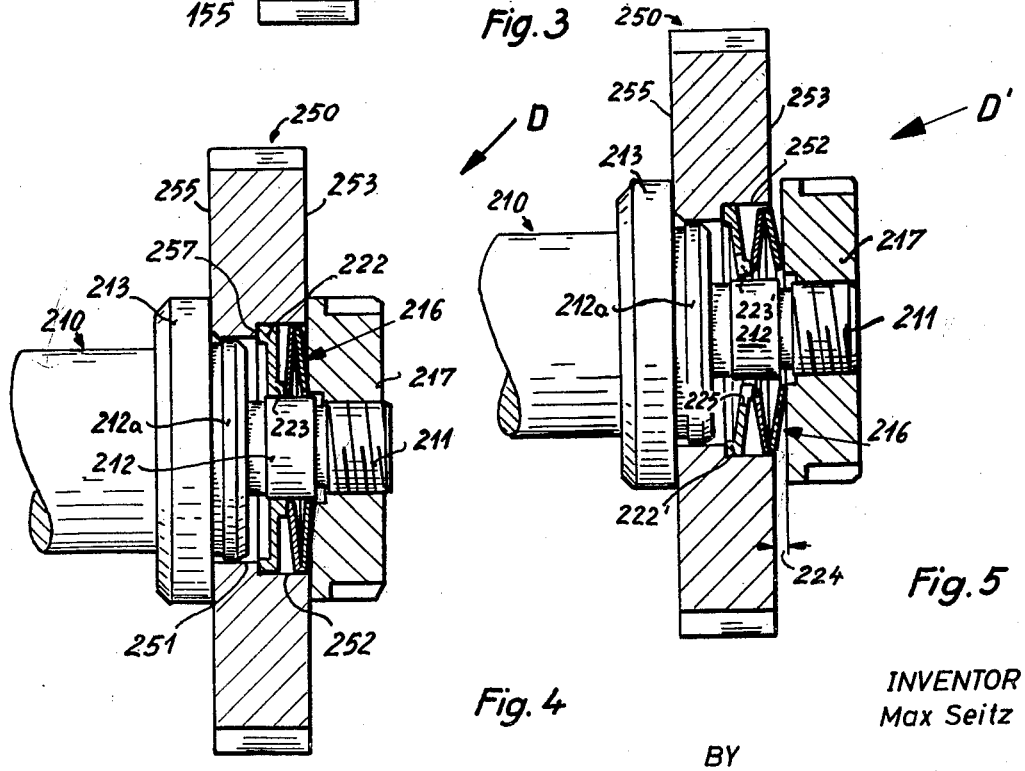

INVENTOR
Max Seitz
BY
Michael S. Striker
his ATTORNEY

Nov. 26, 1963    M. SEITZ    3,112,116
COMBINED CENTERING AND CLAMPING ARRANGEMENT
Filed May 23, 1962    5 Sheets-Sheet 4

INVENTOR
Max Seitz
BY
Michael S. Striker
his ATTORNEY

Nov. 26, 1963 M. SEITZ 3,112,116
COMBINED CENTERING AND CLAMPING ARRANGEMENT
Filed May 23, 1962 5 Sheets-Sheet 5

INVENTOR
Max Seitz
BY
Richard S. Striker
his ATTORNEY

United States Patent Office
3,112,116
Patented Nov. 26, 1963

3,112,116
COMBINED CENTERING AND CLAMPING
ARRANGEMENT
Max Seitz, Munich, Germany, assignor to Carl Hurth
Maschinen- und Zahnradfabrik, Munich, Germany
Filed May 23, 1962, Ser. No. 197,072
Claims priority, application Germany May 25, 1961
25 Claims. (Cl. 279—2)

The present invention relates to a combined centering and clamping arrangement, and more particularly to an arrangement which includes an object having an internal or external cylindrical surface (e.g. a member in the form of a tool or a workpiece) and a device which includes a holder and which centers and simultaneously clamps the object in such a way that the latter is held against axial and radial movements with respect to and may be disposed within or about the holder. Still more particularly, the invention relates to an arrangement which is especially suited for centering and clamping of hollow cylindrical or disk-shaped tools, such as toothed gears or hobs utilized in shaping of gears and similar toothed workpieces.

An important object of the invention is to provide an arrangement of the above outlined characteristics wherein the centering action takes place in a fully automatic way when the object is clamped against axial movements with respect to the holder.

Another object of the invention is to provide a combined centering and clamping arrangement wherein the centering stresses to which the object is subjected are terminated in a fully automatic way in response to termination of clamping stresses.

A further object of the invention is to provide a combined centering and clamping arrangement of the above outlined characteristics which automatically eliminates any, even infinitesimal, radial play of the object when the end faces of the object are clamped and retained against axial movements with respect to its holder.

An additional object of the instant invention is to provide a clamping arrangement of the above described character which comprises a small number of component parts, which may be readily installed in many types of conventional machine tools, and which is constructed and assembled in such a way that the centering force to which the object is subjected is proportional with the clamping force.

A concomitant object of the invention is to provide improved radially acting centering means which is automatically responsive to increasing or decreasing axial clamping stresses and which is constructed and assembled in such a way that axial movements of the movable component of the clamping assembly into and from its clamping position automatically increase or reduce the radially oriented centering forces which tend to prevent radial play of the object with respect to its holder.

Still another object of the invention is to provide a combined centering and clamping arrangement which is equally useful in connection with apertured objects such as must be centered on a holder which passes therethrough, as well as in connection with apertured or non-apertured objects which must be centered within rather than on the holder.

With the above objects in view, the invention resides in the provision of a combined centering and clamping arrangement which comprises a first member (e.g. a toothed gear or the like) having two end faces preferably disposed in planes perpendicular to the axis thereof, a supporting member cooperating with the first member, one of these members having a cylindrical peripheral surface and the other member having a cylindrical internal surface whose diameter is greater than and which surrounds the peripheral surface, centering means engaging or rigid with the first member and at least partially received between the two surfaces so as to be responsive to axial pressure in order to exert substantially radially oriented pressure against the surface of the supporting member whereby to center the one member in the other member, fixed first clamping means adjacent to one end face of the first member, second clamping means movable in the axial direction of and to a position of engagement with the other end face of the first member so as to simultaneously press the one end face into engagement with the first clamping means, and means operatively associated with at least one clamping means for transmitting axial pressure of the one clamping means to the centering means and for thereby biasing the centering means against the surface of the supporting member when the two clamping means engage the respective end faces of the first member so that the clamping action of the two clamping means automatically produces necessary radial forces which center the two members with respect to each other. One of the clamping means is preferably rigid with the supporting member, and the movable clamping means preferably assumes the form of an internally threaded element which meshes with an externally threaded element which may constitute the aforementioned supporting member and which forms part of a holder (e.g. a work spindle or an arbor), the latter rigid with or integral with the fixed clamping means.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is an axial section through a centering and clamping arrangement which embodies one form of my invention and wherein an apertured object is centered on its holder by a centering means including a series of rigid pin-shaped centering elements;

FIG. 2 is a partly elevational and partly axial sectional view of a modified centering and clamping arrangement which differentiates from the arrangement of FIG. 1 in that the means which transmits axial stresses to the pins is located externally of the centered and clamped object;

FIG. 2a is a fragmentary partly elevational and partly axial sectional view of an arrangement which constitutes a modification of the structure shown in FIG. 2;

FIG. 3 is an axial section through a further centering and clamping arrangement wherein the centering elements assume the form of telescoped annuli of conical cross section;

FIG. 4 is an axial section through a fully assembled further centering and clamping arrangement wherein a tool or a like object is centered by the elastically deformable hub of a washer-like centering element;

FIG. 5 illustrates an arrangement which is similar to the arrangement of FIG. 4 and which is shown in partly assembled position;

FIG. 6 is a plan view of the centering element which forms part of the arrangement shown in FIG. 5;

Figure 7:
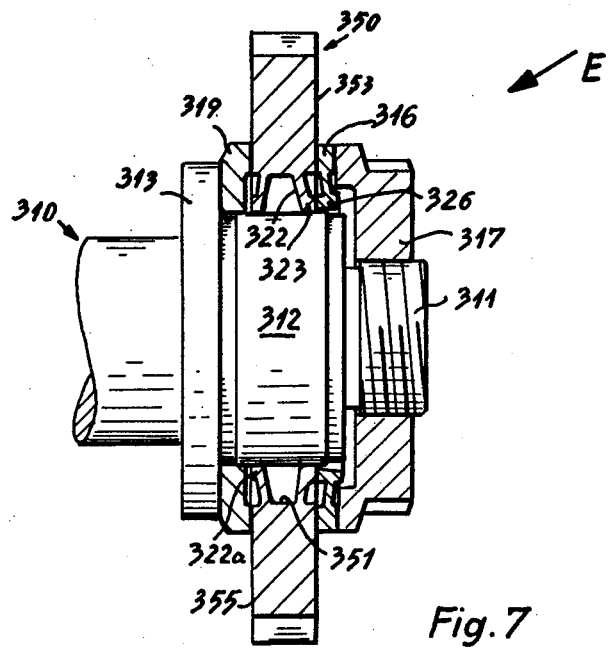
FIG. 7 is an axial section through a different centering and clamping arrangement wherein the centering element or elements are integral with the clamped object.

Referring now in greater detail to the illustrated embodiments, and first to FIG. 1, there is shown a combined centering and clamping arrangement A including a member 50 which assumes the form of an apertured disk- or cylinder-shaped object, e.g. a gear or hob of the type utilized in shaving or other treatment of gears and like workpieces. In the following part of this description, the member 50 will be called a tool.

The arrangement A further comprises a holder 10 which may assume the form of a work spindle or arbor and which includes an externally threaded end portion or element 11, a larger-diameter cylindrical supporting member or head 12 which is inwardly adjacent to the element 11, and a larger-diameter fixed clamping means in the form of a collar 13 which is inwardly adjacent to the head 12.

The tool 50 has a composite coaxial aperture including a smaller-diameter section or bore 51 and a larger-diameter section in the form of an annular depression or recess 52 extending inwardly from the front end face 53 of this tool. A plurality of forwardly and outwardly diverging channels or passages 54 extends between the cylindrical internal surface bounding the bore 51 and the bottom surface of the recess 52, and these passages are preferably uniformly spaced from each other. For example, the tool 50 may be formed with four, six, eight or even more passages 54. Each passage 54 receives a centering element in the form of a slide pin 14 whose length exceeds the length of the respective passage so that, when the supporting head 12 is inserted into the bore 51, the outer end portions or tips of the pins 14 project into the recess 52. These tips abut against the rear side of an axial force-transmitting ring 15 which is axially reciprocable in the recess 52 and whose front side is biased by a resilient element in the form of a helical expansion spring 16, the latter received in a movable clamping means here shown as a cupped nut 17 which may be screwed onto the element 11. The spring 16 is accommodated in the internal chamber 18 of the nut 17 which opens to the front end face 53 of the tool 50. It is preferred to place a washer 19 between the front side of the collar 13 and the rear end face 55 of the tool 50.

The arrangement A of FIG. 1 is utilized for centering the tool 50 on the supporting head 12 and for simultaneously clamping the end faces 53, 55 of the tool between the collar 13 and the nut 17.

The tool 50 has at least some radial play on the supporting head 12, i.e. the diameter of the cylindrical peripheral surface on the head is at least slightly smaller than the diameter of the cylindrical internal surface bounding the bore 51. This is unavoidable since the tool must be free to slide onto and off the head 12; however, when the tool is in actual use such slight tolerances could bring about inaccuracies in the treatment of a gear or a like workpiece which is subjected to the action of teeth 56 forming part of the tool 50. The purpose of the arrangement A is to eliminate such radial play and to simultaneously prevent axial movement of the tool with respect to the holder 10.

In the first step, the operator inserts the supporting head 12 into the composite aperture 51, 52 so that the rear end face 55 of the tool comes into abutment with the washer 19. The outer end portions of the pins 14 then extend into the recess 52. In the next step, the operator inserts the ring 15 into the recess 52 so that the ring comes to rest on the outer end portions of the pins 14. In the final step, the nut 17 is screwed onto the element 11 so that the spring 16 is subjected to progressively increasing compression and biases the ring 15 against the pins 14 whereby the inner end portions of these pins bear substantially radially inwardly against the peripheral surface of the head 12 and automatically center the tool 50 with respect to the holder 10. At the same time, the nut 17 (through the spring 16) biases the rear end face 55 of the tool 50 into engagement with the washer 19 or, in the absence of this washer, directly against the collar 13 of the holder 10. The centering and clamping of the tool 50 are completed when the nut 17 is drawn tight to such an extent that its rear end surface comes into actual abutment with the front end face 53. The spring 16 is now highly compressed to maintain the pins 14 in abutment with the peripheral surface of the head 12 and to simultaneously prevent unintentional unscrewing of the nut.

In FIG. 1, the collar 13 and the washer 19 together constitute a fixed first clamping means, and the nut 17 constitutes a movable second clamping means. Of course, and as shown in FIG. 2, the washer 19 may be omitted if the collar 13 is modified with a view to come into actual abutment with the rear end face 55a of the tool 50a. This modified fixed clamping element forms parts of an arrangement B and is identified by the reference numeral 13a. FIG. 2 also shows that the tool 50a may be formed with an aperture 51a of constant diameter (i.e. without a recess such as the recess 52 in FIG. 1) and that the pins 14 may project beyond the front end face 53a of this tool. The ring 15 is then axially slidably received in the chamber 18a of a slightly different nut 17a. The fixed clamping collar 13a forms part of a holder 10a whose parts 11a, 12a perform the same functions as the parts 11, 12 of the arrangement A shown in FIG. 1.

It will be readily understood that the arrangements A and B may utilize resilient elements other than the helical springs 16. For example, these springs may be replaced by flat springs, by dished springs, by star springs, by elastic washers or by suitable hydraulic or pneumatic biasing means.

FIG. 2a illustrates an arrangement B' which constitutes a modification of the structure shown in FIG. 2. The inclined passages 54b in the tool 50b extend radially outwardly from the aperture 51b toward the rear end face 55b of the tool and are engaged by an axial force-transmitting ring 15 which is located in an internal chamber 13b' of the fixed clamping means 13b. The chamber 13b' accommodates a spring 16 which biases the ring 15 against the outer end portions of the slide pins 14 which are received in the passages 54b and whose inner end portions bear against the cylindrical peripheral surface of the supporting member 12b when the movable clamping means 17b is screwed onto the externally threaded retaining element 11b of the holder 10b so as to engage the front end face 53b and to simultaneously press the rear end face 55b against the fixed clamping means 13b.

As stated before, the spring 16 may be replaced by other types of mechanical as well as by hydraulic or pneumatic biasing means, as long as such biasing means transmit axially oriented forces to the centering pins 14 so that the latter may exert radial force against the peripheral surface of the supporting member 12b.

FIG. 3 illustrates a combined centering and clamping arrangement C which is utilized for centering and clamping of a slightly different tool 150. This tool is formed with a coaxial aperture including a bore 151 whose diameter is at least slightly greater than the diameter of the peripheral surface on the supporting head 112, the latter forming part of a holder 110 which is similar to or identical with that shown in FIG. 1. The bore 151 communicates with a larger-diameter depression or recess 152 which extends inwardly from the front end face 153 of the tool 150 and which accommodates composite centering means including an outer annulus 120 and an inner annulus 121. The outer annulus 120 has a cylindrical outer surface which is slidable along the cylindrical internal surface bounding the recess 152, an outwardly and forwardly diverging conical inner surface which is complementary to the rearwardly and inwardly converging conical outer surface of the inner annulus 121, and an annular rear end surface which normally abuts against an annulus shoulder 157 provided in the tool 150 between the bore 151 and the recess 152. The inner annulus 121 has a cylindrical internal surface which is axially slidable on the peripheral surface of the supporting head 112, and an annular front end surface which is engaged by the rearmost convolution of a helically convoluted resilient element 116, the latter received in the internal chamber 118 of a nut 117 which is screwed onto the foremost element 111 of the holder 110. A washer 119 is interposed between the rear end face 155 of the tool 150 and the front end surface of the collar 113, the latter integral with or rigidly secured to the holder 110.

When the operator desires to mount the tool 150 on the holder 110, he places the washer 119 onto the supporting head 112 and thereupon inserts the head through the composite aperture 151, 152 and into the inner annulus 121. It is assumed that the annuli 120, 121 are already inserted into the recess 152. The operator then beings to screw the nut 117 onto the element 111 whereby, during the initial stage of such application of the nut 117, the spring 116 begins to move the inner annulus 121 in a direction to the left, as viewed in FIG. 3, so as to advance the rear end surface of the outer annulus 120 into abutment with the shoulder 157 and to thereupon axially displace the tool 150 in order to move the rear end face 155 into abutment with the washer 119 and to move this washer into abutment with the collar 113. Once the tool 150 is held against further axial movement toward the collar 113, the nut 117 begins to compress the spring 116 whereby the latter beings to force the inner annulus 121 into the outer annulus 120 so that these annuli frictionally engage the cylindrical surface bounding the recess 152 and the peripheral surface of the head 112 whereby the tool 150 is automatically centered on the holder 110. The tool is securely clamped between the fixed clamping means 113, 119 and the movable clamping means 117 when the latter engages the front end face 153. The spring 116 is now subjected to sufficient compression to maintain the annuli in the illustrated position and to prevent accidental unscrewing of the clamping means 117. The manner in which the tool 150 may be removed from the holder is self-evident, i.e. the operator merely reverse the above-described procedure.

The clamping means 117 is provided with suitably arranged external grooves 117a or the like to permit convenient application of a wrench or another rotary motion transmitting tool.

In the arrangement of FIG. 3, the annuli 120, 121 perform the dual function of centering the tool 150 on the supporting head 112 and of transimtting axial motion to the tool so that the latter is moved into abutment with the washer 119. It is preferred to construct these annuli of at least slightly elastic material so that the thin front end portion of the annulus 120 may resiliently expand into tight frictional engagement with the tool 150 and that the thin rear end portion of the annulus 121 may be resiliently deformed into similar frictional engagement with the head 112.

Referring to FIG. 4, there is shown a combined centering and clamping arrangement D which is utilized for retention of a tool 250, the latter having a coaxial aperture including a bore 251 and a larger-diameter coaxial recess 252 which communicates with the bore 251 and which extends inwardly from the front end face 253 of the tool 250. The bore 251 and the recess 252 define between themselves an annular shoulder 257.

The holder 210 comprises an externally threaded element 211, a composite supporting head which includes a smaller-diameter part 212 and a larger-diameter part 212a, and a fixed clamping collar 213 which is rearwardly adjacent to the part 212a. When the rear end face 255 of the tool 250 abuts against the collar 213, the part 212a is received with at least some play in the bore 251. The recess 252 receives a special centering and axial motion transmitting element 222 whose rear end surface normally abuts against the shoulder 257 and whose hub-shaped central portion 223 abuts against the rearmost dished spring forming part of a resilient package 216 which, in the arrangement of FIG. 4, is received in the recess 252 rather than in the nut 217. The nut 217 meshes with the element 211 and serves as a movable clamping means in that it normally engages the front end face 253 of the tool 250 so as to press the tool against the collar 213 and to simultaneously maintain the element 222 in centering position.

FIG. 5 illustrates a slightly modified arrangement D' utilizing a centering element 222' which is shown in a position it assumes before the nut 217 is drawn tight. The central portion or hub 223' of this elastically deformable element bulges outwardly in a direction toward the nut 217 because the components of the resilient package 216 are not as yet compressed to the extent necessary to deform the hub 223' into the position corresponding to that of the hub 223 shown in FIG. 4 in which the internal surface bounding the coaxial bore of the element 222' would frictionally engage the peripheral surface of the part 212 to center the tool 250. However, when the operator continues to turn the nut 217 so as to reduce to zero the small gap 224 between the rear end surface of the nut and the front end face 253 of the tool 250, the hub 223' of the element 222' is elastically deformed in response to axial pressure transmitted by the compressed components of the resilient package 216 and the hub thereby centers the tool on the holder 210. The rightward deflection of the hub 223' in the latter's unstressed condition has been exaggerated in FIG. 5 for the sake of clarity. The hub 223' is formed with a plurality of radial slots 225 (see FIG. 6) which enable it to sustain the necessary deformation and to assume the position corresponding to that of the unslotted hub 223 shown in FIG. 4 when the nut 217 is drawn tight. The slots 225 extend outwardly from the internal surface of the hub 223' and, if desired, these slots may extend toward but short of the periphery of the centering element 222'. The important feature of this element is that the diameter of its bore is readily reduced in response to compression of the resilient package 216 so that the internal surface bounding the opening of the hub 223' will frictionally engage the peripheral surface of the part 212 and will thereby center the tool 250 on the part 210.

The larger-diameter part 212a of the composite head serves as a coarse centering device for the tool 250. The components of the resilient package 216 are received with small radial play on the part 212 and their diameters are selected in such a way that they do not reach the cylindrical internal surface bounding the recess 252 even if the package 216 is in fully compressed condition.

When the operator introduces the part 212 into the recess 252 and begins to apply the nut 217, the package 216 automatically advances the rear end face 255 of the tool 250 into abutment with the collar 213 without causing the element 222' to immediately assume a position corresponding to the position of the element 222 shown in FIG. 4. Such deformation of the hub 223' takes place when the rear end face 255 is in actual abutment with the collar 213 but before the nut 217 comes into clamping engagement with the front end face 253. The element 222' returns to the position of FIG. 5 as soon as the pressure of the package 216 is relaxed, i.e. as soon as the gap 224 between the nut 217 and the front end face 253 of the tool 250 reaches a predetermined width. The function of the element 222 in FIG. 4 is analogous. Since its deformation is rather small, the element 222 is not slotted.

The arrangement E of FIG. 7 is analogous to the arrangements D, D' of FIGS. 4 and 5 with the exception that the centering element 222 or 222' is replaced by a similar centering element 322 which latter, however, forms an integral part of or is rigid with the tool 350. The element 322 extends into the aperture 351 and is adjacent to the front end face 353 of the tool 350, and the latter comprises a second centering element 322a which is adjacent to the rear end face 355. The element 322a is put to use when the tool 350 is mounted on the holder 310 in such a way that its rear end face 355 is turned toward the nut 317.

The resilient package 216 of FIGS. 4 and 5 is replaced by a single annular dished spring 316 which is inserted between the front end face 353 and the nut 317 and whose annular central portion 326 is adapted to elastically deform the hub 323 of the element 322 into centering engagement with the peripheral surface of the head 312 when the rear end face 355 abuts against a washer 319 which in turn abuts against the collar 313, and when the nut 317 is screwed onto the element 311 of the holder 310 so as to bear against the front end face 353.

When the nut 317 is rotated in a direction to move toward the tool 350, the elastic deformation of the hub 323 and the resultant centering of the tool precedes the clamping of this tool against the collar 313.

Figure 8:
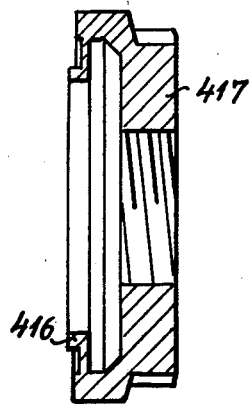
FIG. 8 is an axial section through a modified movable clamping element which may be utilized in the arrangement of FIG. 7.

FIG. 8 shows that the nut 317 and the resilient element 316 of the arrangement E may be replaced by a nut 417 which comprises an integral resilient element 416. The nut 417 may be utilized in the arrangement of FIG. 7.

Figure 9:
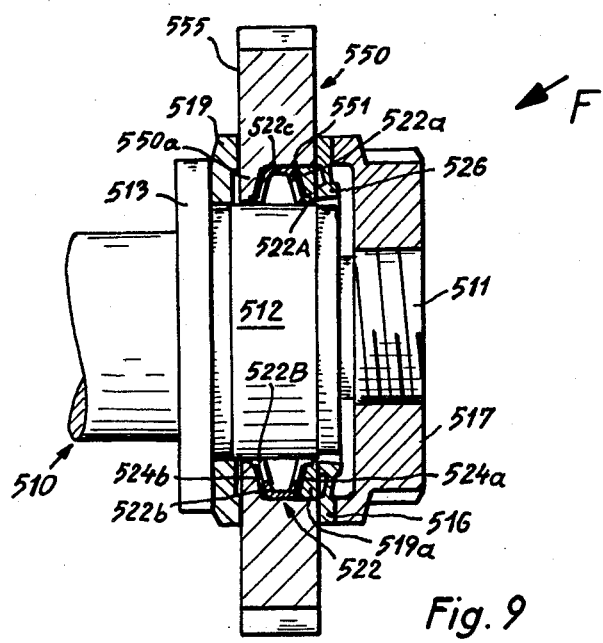
FIG. 9 is an axial section through a centering and clamping arrangement which is somewhat similar to the arrangement of FIG. 7 with the exception that it utilizes a different centering element of U-shaped cross section which is not integral with the object that is to be centered.

FIG. 9 illustrates a further arrangement F which is utilized for centering and for clamping a tool 550 between a washer 519 and a nut 517. In this arrangement, the combined centering and axial motion transmitting element 522 assumes the form of a channelled ring having a web 522c and two radially inwardly extending annular flanges 522a, 522b each provided with radial slots 525 which extend radially outwardly from the cylindrical internal surface of the respective flange. The outwardly bent innermost edge portion 522B of the flange 522b abuts against an inwardly projecting annular extension 550a of the tool 550 which extension is adjacent to the washer 519 and which receives with some radial play the head 512 of a holder 510. It will be readily understood that the extension 550a may constitute a detachable component part of the tool 550.

The annular central portion 526 of a spring 516 acts against a second washer 519a which in turn abuts against the outwardly bent innermost edge portion 522A of the flange 522a to deform this flange into frictional engagement with the head 512 when the nut 517 is drawn tight on an externally threaded element 511 of the holder 510 to force the rear end face 555 of the tool 550 into abutment with the washer 519. The latter abuts against a collar 513 which forms part of the holder 510.

It is preferred to provide a small clearance 524a between the outer side of the flange 522a and the adjacent side of the washer 519a. A similar clearance 524b is provided between the outer side of the flange 522b and the adjacent side of the extension 550a. The washer 519a is axially movably received in the aperture 551 of the tool 550 and permits withdrawal of the centering element 522 from this aperture when the nut 517 is separated from the element 511.

Figure 11:
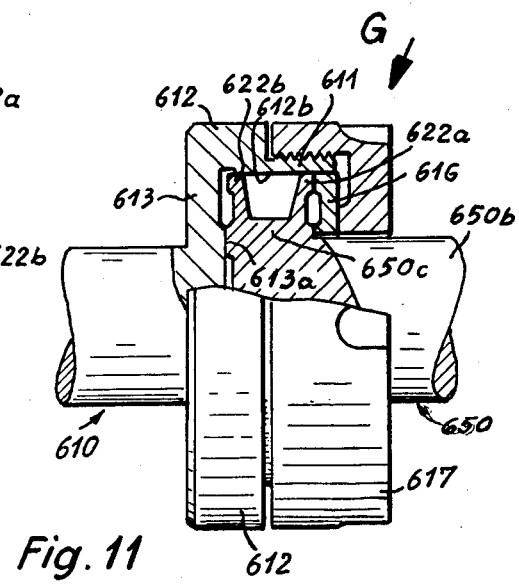
FIG. 11 is a partly elevational and partly sectional view of a centering and clamping arrangement wherein a portion of the object to be centered is received in the interior of the holder.

The arrangement G of FIG. 11 is utilized for centering the shaft 650b of a tool 650 or the like in a cupped supporting member or head 612 which forms part of or which is rigidly connected to a modified holder 610. In this embodiment, the stationary or fixed clamping means assumes the form of a plate 613 forming part of the head 612 and having a front surface 613a perpendicular to the axis of the holder 610 and constituting the bottom surface in a cylindrical space 612b of the supporting member 612. The tool 650 comprises a larger-diameter end portion 650c which is received in the space 612b and which carries two annular centering elements 622a, 622b. The outermost edge portion of the centering element 622a abuts against a bead provided adjacent to the periphery of a dished spring 616, and the hub of this spring abuts against a shoulder defined by the end portion 650c when an internally threaded cap-shaped clamping nut 617 is drawn tight on an externally threaded element 611 which is integral with the supporting member 612. The spring 616 then causes slight radial expansion of the centering element 622a into frictional engagement with the cylindrical internal surface of the element 611 and thereby centers the end portion 650c of the tool 650 in the holder 610. If desired, the stationary clamping means 613 may be provided with a forwardly projecting annular extension (not shown) which deforms the centering element 622b into frictional engagement with the cylindrical internal surface of the supporting member 612 when the movable clamping means or nut 617 is drawn tight. A hob (not shown) may be provided on the shaft 650b adjacent to the nut 617, and it will be noted that the shaft 650b extends through a coaxial bore of this nut.

The spring 616 serves as a means for transforming axially oriented pressure of the nut 617 into radially outwardly directed pressure of the centering element 622b and/or 622a to make sure that the centering action is brought about in a fully automatic way when the end portion 650c is clamped between the clamping means 613, 617.

Figures 12, 13:
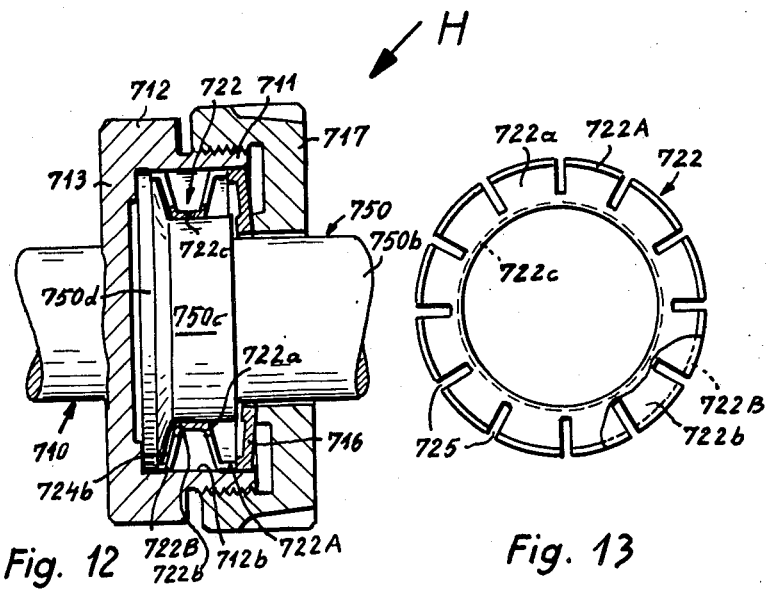
FIG. 12 is an axial section through a modification of the arrangement shown in FIG. 11 which utilizes a centering element similar to the one shown in FIGS. 9 and 10.
FIG. 13 is a plan view of the centering element shown in FIG. 12.

FIG. 12 illustrates an arrangement H wherein the holder 710 comprises a cupped supporting member 712 defining an internal space 712b for the larger-diameter end portion 750c of an object (e.g. a tool 750) which requires centering. The shaft 750b of the tool 750 extends through a coaxial bore provided in a movable clamping means in the form of a cap-shaped internally threaded nut 717, the latter meshing with an externally threaded element 711 forming part of the supporting member 712.

Figure 10:
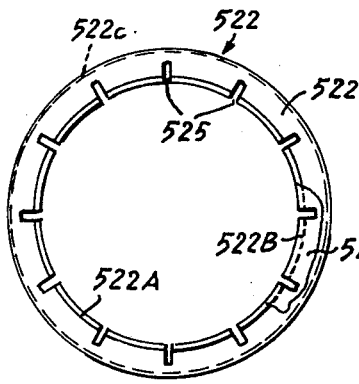
FIG. 10 is a plan view of the centering element shown in FIG. 9.

The centering element 722 (see also FIG. 13) is similar to the centering element 522 of FIGS. 9 and 10, with the exception that its flanges 722a, 722b extend outwardly so that their respective annular edge portions 722A, 722B may be deformed into frictional centering engagement with the cylindrical internal surface of the supporting member 712. The cylindrical web 722c of the element 722 is snugly fitted onto the end portion 750c.

The edge portion 722A is engaged by an annular bead provided on a resilient element in the form of a spring washer 716 which is engaged by the hub of the nut 717. The spring 716 also presses the edge portion 722B against a collar 750d of the end portion 750c, and this collar then abuts against a fixed clamping means in the form of a plate 713 which connects the cylindrical portion of the supporting member 712 with the remainder of the holder 710. A slight clearance 724b is provided between the left-hand side of the flange 722b and the adjacent side of the collar 705d.

FIG. 13 shows that the flanges 722a, 722b are formed with inwardly extending radially oriented slots 725 which enhance the resiliency of the centering element 722.

Figure 14:
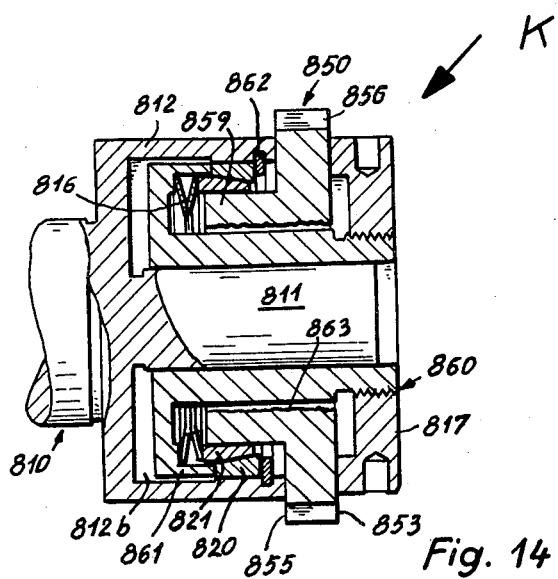
FIG. 14 is an axial section through an arrangement wherein a portion of the object to be centered extends into a cupped portion of the holder.

Referring finally to FIG. 14, there is shown a combined clamping and centering arrangement K wherein the object to be centered assumes the form of a gear 850 constituting a gear shaping tool and having teeth 856 and a hub 859 which projects beyond the rear end face 855. The front end face 853 of the tool 850 abuts against a movable clamping means in the form of a nut 817 whose internal threads mesh with external threads of a sleeve 860 to thereby urge the rear end face 855 into abutment with the front end face of a cupped supporting member 812 which forms part of a holder 810. The supporting member 812 defines a cylindrical internal space 812b which accommodates a cylindrical mantle 861 of the sleeve 860, a package of dished springs 816 which are received in the mantle 861, and a pair of annular centering elements 820, 821 the former of which abuts against a split ring 862 and the latter of which abuts against the rightmost spring 816. The sleeve 860 is precision-fitted onto and is axially movable along a coaxial cylindrical projection 811 of the holder 810.

The arrangement K is assembled as follows:

In the first step, the element 811 is introduced into the sleeve 860 so that the mantle 861 is accommodated in the space 812a. In the next step, the operator introduces the springs 816 so that these springs come to rest against the bottom wall of the mantle. The inner centering element 821 is introduced in a subsequent step, followed by the element 820 and by the split ring 862 which latter is snapped into a suitable annular recess provided in the internal surface of the supporting member 812. The operator then introduces the hub 859 of the tool 850 so that this hub extends into the bore of the centering element 821, and the tool 850 is centered in a fully automatic way as soon as the nut 817 is screwed onto the sleeve 860. The centering action of the elements 820, 821 is identical with the action of elements 120, 121 which were described in connection with FIG. 3.

It will be noted that the bore 863 of the tool 850 need not be precision finished and that this bore need not fit onto the sleeve 860 because the tool is centered between the periphery of the hub 859 and the internal surface of the suporting member 812.

It will be noted that the combined clamping and centering arrangement of my invention is equally useful for centering an apertured object on a holder or for centering a portion of or the entire object in a holder or in another component part of the arrangement. In the latter instance, the object may but need not be formed with an aperture.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A combined clamping and centering arrangement, comprising a first member having a first end face and a second end face; a supporting member, one of said members having a cylindrical peripheral surface and the other member having a cylindrical internal surface disposed about and of a diameter at least slightly greater than the diameter of said peripheral surface; centering means cooperating with said first member, said centering means at least partially received between said surfaces and responsive to axial pressure to exert substantially radial pressure against the surface of said supporting member so as to center said one member in said other member; fixed first clamping means adjacent to one of said end faces; second clamping means movable in the axial direction of said first member to a position of engagement with the other end face so as to press said one end face into engagement with said first clamping means, one of said clamping means rigid with said supporting member; and means operatively associated with at least one of said clamping means for transmitting axial pressure to said centering means and for thereby biasing said centering means against the surface of said supporting member when said first and second clamping means engage the respective end faces of said first member.

2. An arrangement as set forth in claim 1, wherein said one member is said first member.

3. An arrangement as set forth in claim 1, wherein said one member is said first member, and wherein said one clamping means is said second clamping means.

4. An arrangement as set forth in claim 1, wherein said second clamping means comprises a threaded element, and further comprising a second threaded element rigid with said first clamping means, one of said elements having internal threads, the other element having mating external threads and said elements meshing with each other when the end faces of said first member are engaged by the respective clamping means.

5. An arrangement as set forth in claim 1, wherein said second clamping means comprises an internally threaded portion and said other member comprises an externally threaded portion meshing with said internally threaded portion when said first member is engaged by said first and second clamping means.

6. A combined centering and clamping arrangement, comprising a first member having an aperture, cylindrical internal surface means bounding said aperture, a first end face, and a second end face; a holder comprising fixed clamping means adjacent to one of said end faces, an externally threaded element, and a supporting member located intermediate said clamping means and said element, said supporting member having cylindrical peripheral surface means of a diameter smaller than the diameter of said internal surface means and slidably received in said aperture; centering means cooperating with said first member, said centering means at least partially received between said surface means and movable into and out of centering engagement with said peripheral surface means in response to axial forces; movable clamping means having internal threads meshing with said element, said movable clamping means engaging the other end face of said first member so as to press said one end face against said fixed clamping means; and resilient means provided intermediate said movable clamping means and said centering means for transmitting axial force of said movable clamping means to said centering means and for thereby biasing said centering means into centering engagement with said peripheral surface means when said fixed and said movable clamping means engage the respective end faces of said first member.

7. A combined centering and clamping arrangement, comprising a first member having an aperture, cylindrical internal surface means bounding said aperture, a first end face, and a second end face, said end faces disposed in planes perpendicular to the axis of said aperture; a holder comprising fixed clamping means adjacent to one of said end faces, an externally threaded element, and a supporting member located intermediate said clamping means and said element, said supporting member having cylindrical peripheral surface means of a diameter smaller than the diameter of said internal surface means and slidably received in said aperture; centering means integral with said first member, said centering means at least partially received between said surface means and having an annular central portion movable into and out of centering engagement with said peripheral surface means in response to axial forces; movable clamping means having internal threads meshing with said element, said movable clamping means engaging the other end face of said first member so as to press said one end face against said fixed clamping means; and resilient means provided intermediate said movable clamping means and said centering means for transmitting axial force of said movable clamping means to said central portion and for thereby biasing said central portion into centering engagement with said peripheral surface means when said fixed and said movable clamping means engage the respective end faces of said first member.

8. A combined centering and clamping arrangement, comprising a first member having an aperture, cylindrical internal surface means bounding said aperture, a first end face, and a second end face; a holder comprising fixed clamping means adjacent to one of said end faces, a retaining element, and a supporting member located intermediate said clamping means and said element, said supporting member having cylindrical peripheral surface means of a diameter smaller than the diameter of said internal surface means and slidably received in said aperture; centering means cooperating with said first member, said centering means at least partially received between said surface means and movable into and out of centering engagement with said peripheral surface means in response to axial forces; movable clamping means axially movably mounted on said element, said movable clamping means engaging the other end face of said first member so as to press said one end face against said fixed clamping means; and resilient means provided intermediate said movable clamping means and said centering means for transmitting axial force of said movable clamping means to said centering means and for thereby biasing said centering means into centering engagement with said peripheral surface means when said fixed and said movable clamping means engage the respective end faces of said first member.

9. A combined centering and clamping arrangement, comprising a first member having an aperture including a smaller-diameter section and a coaxial larger-diameter section, cylindrical internal surface means bounding said sections, a shoulder intermediate said sections, a front end face adjacent to said larger-diameter section, and a rear end face adjacent to said smaller-diameter section; a holder comprising fixed clamping means adjacent to said rear end face, a retaining element adjacent to said front end face, and a supporting member disposed intermediate said element and said clamping means, said supporting member having a cylindrical peripheral surface with a diameter smaller than the diameters of said internal surface means and slidably received in said aperture; a centering element having an outer annular portion snugly received in said larger-diameter section and abutting against said shoulder, and a resiliently deformable annular central portion having an internal surface movable into and out of centering engagement with said peripheral surface; second clamping means axially movably mounted on said element and movable into clamping engagement with said front end face so as to press said rear end face against said fixed clamping means; and resilient means disposed between said second clamping means and said central portion for deforming said central portion and for thereby moving said internal surface into centering engagement with said peripheral surface when said clamping means engage the respective end faces.

10. An arrangement as set forth in claim 9, wherein said centering element has a plurality of slots extending radially outwardly from the internal surface of said central section.

11. An arrangement as set forth in claim 9, wherein said resilient means comprises at least one annular dished spring disposed in the larger-diameter section of said first member and axially movably surrounding said holder.

12. A combined centering and clamping arrangement, comprising a first member having an aperture including a smaller-diameter section and a coaxial larger-diameter section, cylindrical internal surface means bounding said sections, a shoulder intermediate said sections, a front end face adjacent to said larger-diameter section, and a rear end face adjacent to said smaller-diameter section; a holder comprising fixed clamping means adjacent to said rear end face, a retaining element adjacent to said front end face, and a supporting member disposed intermediate said element and said clamping means, said supporting member having a cylindrical peripheral surface with a diameter smaller than the diameters of said internal surface means and slidably received in said aperture; a first annular centering element having a cylindrical outer surface snugly received in said larger-diameter section, an end surface abutting against said shoulder, and a conical internal surface diverging outwardly toward said front end face; a second annular centering element having a cylindrical internal surface snugly surrounding said peripheral surface, an end surface adjacent to said front end face, and a conical external surface complementary to and received in said conical internal surface; second clamping means axially movably mounted on said element and movable into clamping engagement with said front end face so as to press said rear end face against said fixed clamping means; and resilient means disposed intermediate said second clamping means and the end surface of said second centering element for biasing said second centering element into said first centering element whereby the cylindrical surfaces of said first and second centering elements respectively engage the surface means bounding said larger-diameter section and said peripheral surface to center said first member on said supporting member when said clamping means engage the respective end faces.

13. An arrangement as set forth in claim 12, wherein said element is externally threaded, wherein said second clamping means is an internally threaded cup-shaped nut meshing with said element and having an internal chamber open to said larger-diameter section, and wherein said resilient means is a helical spring partially received in said internal chamber and compressed by said nut when the latter engages said front end faces.

14. An arrangement as set forth in claim 12, wherein said centering elements consist of elastically deformable material.

15. An arrangement as set forth in claim 12, wherein said fixed clamping means comprises a collar rigid with said holder and an annular washer interposed between said collar and said rear end face.

16. A combined centering and clamping arrangement, comprising a member having an aperture bounded by cylindrical surface means, a front end face, a rear end face, and a plurality of inclined radially outwardly extending passages communicating with said aperture and open to said front end face; a holder comprising fixed clamping means adjacent to said rear end face, an externally threaded element adjacent to said front end face, and a supporting head disposed intermediate said element and said clamping means, said head having a cylindrical peripheral surface of a diameter smaller than the diameter of said surface means and slidably received in said aperture; a plurality of centering pins, one for each of said passages, said pins slidably received in the respective passages and each having an inner end portion abutting against the peripheral surface of said supporting head and an outer end portion extending from the respective passage; second clamping means comprising an internally threaded nut meshing with said element and engaging said front end face so as to press said rear end face against said fixed clamping means; and resilient means interposed between said second clamping means and the outer end portions of said pins for biasing the inner end portions of said pins into centering engagement with said peripheral surface when said clamping means engage the respective end faces.

17. An arrangement as set forth in claim 16, wherein said nut has an internal chamber open toward said front end face and said resilient means is a helical spring at least partially received in said chamber.

18. An arrangement as set forth in claim 16, further comprising a motion-transmitting ring interposed between said resilient means and the outer end portions of said pins.

19. An arrangement as set forth in claim 16, wherein said aperture comprises a larger-diameter section extending inwardly from said front end face and the outer end portions of said pins extend into said larger-diameter section.

20. An arrangement as set forth in claim 16, wherein the outer end portions of said pins extend beyond the front end face of said member.

21. A combined centering and clamping arrangement, comprising a member having an aperture bounded by cylindrical surface means, a first end face and a second end face, said end faces disposed in planes perpendicular to the axis of said aperture; a holder comprising fixed clamping means adjacent to one of said end faces, an externally threaded element adjacent to the other end face of said member, and a supporting head located intermediate said clamping means and said end portion, said head coaxial with said end portion and having a cylindrical peripheral surface with a diameter at least slightly smaller than the diameter of said surface means; centering means comprising at least one annular element integral with said member, said element at least partially received in said aperture and including a resiliently deformable annular central portion having internal surface means movable into and out of centering engagement with the peripheral surface of said head; internally threaded movable clamping means meshing with said threaded element and clampingly engaging the other end face of said member so as to press said one end face against said fixed clamping means; and resilient means provided intermediate said movable clamping means and said central portion for deforming said central portion and for thereby moving said internal surface means into centering engagement with said peripheral surface when said clamping means engage the respective end faces.

22. A combined centering and clamping arrangement, comprising a member having an aperture bounded by cylindrical surface means, a first end face and a second end face, said end faces disposed in planes perpendicular to the axis of said aperture; a holder comprising fixed clamping means adjacent to one of said end faces, an externally threaded element adjacent to the other end face of said member, and a supporting head located intermediate said clamping means and said end portion, said head coaxial with said end portion and having a cylindrical peripheral surface with a diameter at least slightly smaller than the diameter of said surface means; centering means comprising at least one annular element integral with said member, said element at least partially received in said aperture and including a resiliently deformable annular central portion having internal surface means movable into and out of centering engagement with the peripheral surface of said head; internally threaded movable clamping means meshing with said threaded element and clampingly engaging the other end face of said member so as to press said one end face against said fixed clamping means; and resilient means integral with said movable clamping means and adjacent to said central portion for deforming said central portion and for thereby moving said internal surface means into centering engagement with said peripheral surface when said clamping means engage the respective end faces.

23. A combined centering and clamping arrangement, comprising a member having an aperture bounded by cylindrical surface means, a first end face and a second end face, said end faces disposed in planes perpendicular to the axis of said aperture; a holder comprising fixed clamping means adjacent to one of said end faces, an externally threaded element adjacent to the other end face of said member, and a supporting head located intermediate said clamping means and said end portion, said head coaxial with said end portion and having a cylindrical peripheral surface with a diameter at least slightly smaller than the diameter of said surface means; centering means comprising at least one annular element integral with said member, said element at least partially received in said aperture and including a resiliently deformable annular central portion having substantially radially outwardly extending slot means and internal surface means movable into and out of centering engagement with the peripheral surface of said head; internally threaded movable clamping means meshing with said threaded element and clampingly engaging the other end face of said member so as to press said one end face against said fixed clamping means; and resilient means provided intermediate said movable clamping means and said central portion for deforming said central portion and for thereby moving said internal surface means into centering engagement with said peripheral surface when said clamping means engage the respective end faces.

24. A combined centering and clamping arrangement, comprising a first member having a through aperture bounded by cylindrical surface means, a first end face at one end of said aperture, and a second end face at the other end of said aperture; a holder comprising fixed clamping means adjacent to one of said end faces, a retaining element spaced from said clamping means, and a supporting member disposed intermediate said retaining element and said clamping means, said supporting member having a cylindrical peripheral surface of a diameter smaller than the diameter of said surface means and slidably received in said aperture; centering means at least partially received in said aperture and movable substantially radially into centering engagement with said peripheral surface in response to axial pressure exerted against said centering means; second clamping means axially adjustably mounted on said retaining element and movable into clamping engagement with the other end face of said first member so as to press said one end face against said fixed clamping means; and means operatively associated with said movable clamping means for transmitting axial pressure to said centering means in response to movement of said movable clamping means into engagement with said other end face so that said centering means automatically centers said first member on said supporting member when said clamping means engage the respective end faces.

25. A device for clamping the end faces of and for centering an apertured object, comprising a holder having fixed clamping means adjacent to one end face of the object, an externally threaded element, and an object supporting head disposed intermediate said clamping means and said element and slidably received in the apertured object; centering means at least partially received in the apertured object and movable into and out of centering engagement with said head; movable clamping means meshing with said element and clampingly engaging the other end face of the object so as to press the one end face of the object against said fixed clamping means; and resilient means provided intermediate one of said clamping means and said centering means for biasing said centering means into engagement with said head when said clamping means engage the respective end faces of the object.

References Cited in the file of this patent

UNITED STATES PATENTS

| | | |
|---|---|---|
| 2,742,296 | Satterlee | Apr. 17, 1956 |
| 2,778,647 | Benjamin | Jan. 22, 1957 |
| 2,801,858 | Spieth | Aug. 6, 1957 |
| 2,989,327 | Hermanus | Jan. 20, 1961 |